Dec. 7, 1954          W. SWENSON            2,696,061
                     SPINNING LURE
                  Filed June 30, 1948
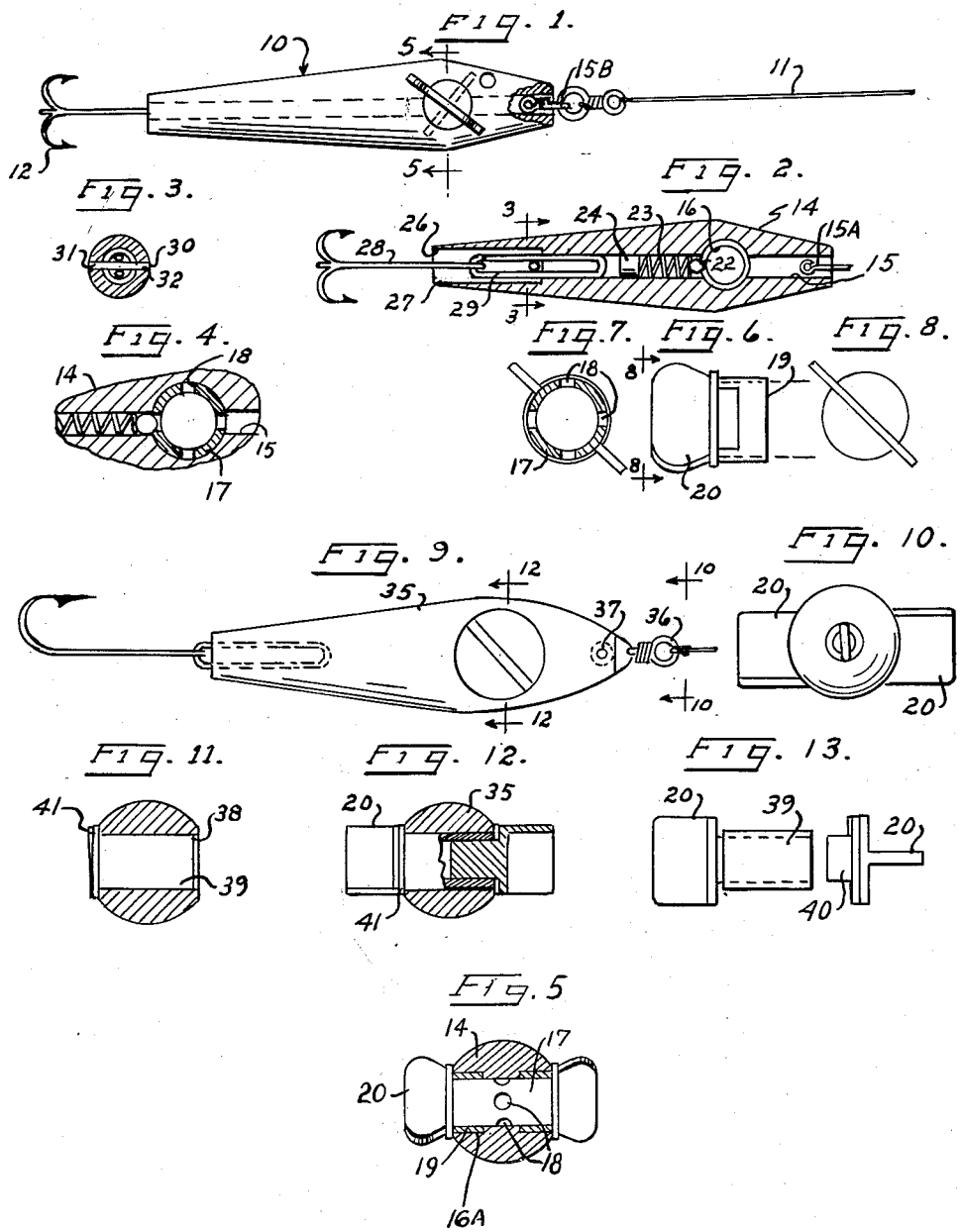
INVENTOR
WYMAN SWENSON
BY Howard T. Jeanhn
ATTORNEY United States Patent Office 2,696,061
Patented Dec. 7, 1954

2,696,061

SPINNING LURE

Wyman Swenson, White Plains, N. Y.

Application June 30, 1948, Serial No. 36,101

1 Claim. (Cl. 43—42.22)

This invention relates to spinning lures for fishing and more particularly to an artificial bait which is constructed to resemble a fish or at least the shape and color is similar to a minnow or small fish and in addition, the fins of the fish are so positioned in a set relation with the body so that as the lure is pulled through the water, the resistance of the fins to the normal flow of the water will cause the lure to spin. This is accomplished by the angle at which the fins are placed to obtain the direction of spin and the degree of spin.

Spinning lures have been made and used but in the past they were made with the fins in a set position. One lure may be used that will have a clockwise spin while another lure may be used that will have a counter-clockwise spin.

It is an object of this invention to provide a spinning lure in which a pair of adjustable fins are inserted to provide means to control the direction of spin.

A further object of this invention is to provide a spinning lure in which a pair of adjustable fins are provided to permit a predetermined positioning of the fins to produce a rate of spin as desired.

A further object of this invention is to provide a lure with a pair of adjustable fins that may be set in a predetermined position to produce a skipping or jumping action of the lure as it is towed through the water.

It is apparent that various changes and modifications may be made to this device to produce similar results and other objects of this invention may be apparent by reference to the accompanying detailsd description and drawing in which:

Fig. 1 illustrates one embodiment of this invention,

Fig. 2 is a cross sectional view of the device as shown in Fig. 1 taken on a plane passing substantially through the longitudinal axis of the body, Fig. 3 illustrates a cross sectional view taken on line 3—3 of Fig. 2, Fig. 4 illustrates a partial cross sectional view of the fin positioning tube, Fig. 5 illustrates a cross sectional view taken on line 5—5 of Fig. 1, Fig. 6 illustrates one of the fins, Fig. 7 is a sectional view illustrating the fin after it has been pressed onto the fin positioning tube, Fig. 8 is a side elevational view taken on line 8—8 of Fig. 6, Fig. 9 illustrates another embodiment of this invention, Fig. 10 is an end elevational view taken on line 10—10 of Fig. 9, Fig. 11 is a cross sectional view of the body of the lure with the fins removed, Fig. 12 is a fragmentary cross sectional view taken on line 12—12 of Fig. 9, and Fig. 13 is an exploded view of the fins and their component parts.

Referring to the various figures in which identical numerals are used to refer to the same parts, there is illustrated in Fig. 1 a spinning lure 10 which in use is normally affixed to a fishing line 11, and the lure is provided with a plurality of hooks 12. This type of lure is normally used for casting or trolling and is generally prepared in a bright color to attract the attention of the fish. The main feature of this lure is its ability to spin while being pulled through the water.

Referring to Fig. 2 it is apparent that this lure may be constructed of a body portion 14 to resemble a minnow or fish and a central bore 15 is cut lengthwise through the body 14 while a larger bore 16 is cut crosswise through the body 14. Bore 16 is provided with a slightly enlarged recess 16A on either side thereof.

Referring to Fig. 5 there is illustrated in cross section the body 14. A tubular member 17 is formed to fit the bore 16. Member 17 is slightly enlarged in Figs. 4, 5, 6, and 7 to clearly illustrate its structure. The tube 17 is provided with four apertures 18 evenly spaced about the central portion of the tube. When the tube 17 is mounted in the bore 16, these apertures 18 should align with the bore 15 of the body 14. A pair of fins 20 are provided, each fin having a circular socket 19 at one end thereof and a blade structure at the opposite end. The socket 19 of the fins 20 is of a predetermined size to fit over tube 17 (Fig. 7) yet frictionally grasp the tube to retain the position at which it may be set. The socket end 19 of fin 20 also fits into the recess 16A of the body 14 (Fig. 5). Thus it is apparent that tube 17 has a fin 20 mounted on either side thereof and the fins 20 are easily pressed onto the tube 17. The fins may be adjusted by rotating while tube 17 remains stationary. Thus as assembled, it is necessary to align the fins 20 in the direction in which it is intended to have the fins to produce a spinning action of the lure. If the two fins are placed at ninety degrees to each other, it is apparent that with the fins in the position illustrated in Fig. 1, the lure will produce a counter-clockwise rotation when drawn through the water. In order that the tube 17 will remain in a position as illustrated in Fig. 1, a small ball 22 is inserted from the rear end of the body 14 with a spring 23 to press the ball and a plastic plug 24 to retain the spring 23; by forcing this through the bore 15, the ball 22 will provide a lock when it is aligned with one of the apertures 18 of the tube 17. It is apparent that in addition to providing a locking means to hold the fins in a set relationship, the fins may be turned 180 degrees and the ball 22 will again lock the tube 17 in that position and the lure 10 would then have a clockwise rotation when drawn through the water. Thus with the construction described, the lure 10 may be set to spin in either a clockwise or counter-clockwise direction thus assisting the average fisherman in maintaining his line in a normal condition; that is, when using a lure that spins in one direction considerable twist is added to the fishing line and by the simple expedient of reversing the direction of spin and continuing to use the spinning lure, the line will be rotated until all twist has been removed. Another feature of the lure 10 is the manner of mounting the hook or hooks. A bore 26 is provided in the rear end of the body 14 and a tube 27 may be inserted in the bore 26. A fish hook stem 28 is provided and a wire loop 29 is passed about the end of the stem 28; the loop 29 is inserted through bore 26 into bore 15. A pin 30 is then passed through the body 14 through a pair of apertures 31 and 32 passing through the loop 29 and through the tube 27 holding it in a tight relationship. Thus the hook or hooks are retained in a definite relationship with the body of the lure.

Referring to Fig. 9 there is illustrated a further embodiment of this invention in which a body portion 35 is cast in the general configuration of a minnow or a small fish and the body may be drilled similar to the prior embodiment already described to affix the hook or hooks to the minnow body, and similarly, the fish line may be secured to a ring member 36 that is in turn attached to a swivel ring and the ring in turn secured by means of a pin 37 that is passed through the body portion 35 to retain the assembly as illustrated in Fig. 9.

Referring to Fig. 11 a cross sectional view of the body 35 is illustrated in which a bore 38 is provided and a tube 39 is mounted within the bore 38.

Referring to Fig. 10 there is illustrated an end view of the spinning lure illustrating the fins 20 secured in their proper position with relation to the body 35.

Referring to Fig. 13 the fins 20 and tube 39 are illustrated in their proper relationship. The fin 20 is provided with a circular base portion 40 that may be pressed into the opening in the tube 39 to retain a frictional gripping. Thus when the fins 20 are mounted to the body portion 35 as illustrated in Fig. 12, the fins 20 may be positioned in any desired angular relationship to produce a desired spinning action. In order that the fins 20 will remain in the position they are set, a small lock washer 41 (Figs. 11 and 12) is provided and mounted between the fin and the face of the body 35 so that with a pressed fit, the lock washer will retain the fins in any position they are set and prevent further movement until the fins are reset. Thus with the embodiment illustrated in Figs. 9 through 13, a lure and its construction is illustrated that permits adjustment and setting of the fins in any desired position. Thus the lure may be made to spin in a clockwise or counter-clockwise direction or both fins may be set in parallel relationship at an angle that will produce a jumping or skipping action of the lure. Similarly, the fins may be set to produce a slow or fast rotative action according to the fisherman's desire.

Various changes and modifications may be made to the lures disclosed herein without departing from the spirit of this invention and this invention shall be limited only by the appended claim.

What is claimed is:

A fishing lure which includes a body member and a pair of removable adjustable fins mounted thereon, each fin provided with a blade portion extending exteriorly of the body for deflecting the same and a socket portion, said body provided with a central bore throughout its length, and a cross bore for mounting the adjustable fins on said body, a cross member adjustably mounted in said cross bore, said socket portion of said fins fitted into said body, one at each end of said cross bore and frictionally affixed to said cross member so that the blades of the fins may be independently set in a plurality of predetermined relationships to regulate deflection of the lure, a spring detent mounted in said central bore to bear against said cross member and lock said cross member in one of a plurality of positions of adjustment, whereby said independently adjusted blades and said cross member may be selectively positioned as a unit with respect to said body to regulate the direction of deflection thereof.

References Cited in the file of this patent

UNITED STATES PATENTS

| Number | Name | Date |
| --- | --- | --- |
| 1,102,207 | Belknap | June 30, 1914 |
| 1,870,559 | Drake | Aug. 9, 1932 |
| 2,196,508 | Steinhoff | Apr. 9, 1940 |
| 2,266,944 | Whitworth | Dec. 23, 1941 |

FOREIGN PATENTS

| Number | Country | Date |
| --- | --- | --- |
| 3,733 | Great Britain | Dec. 16, 1899 |
| 5,757 | Great Britain | Mar. 19, 1895 |
| 119,879 | Sweden | July 31, 1947 |
| 535,080 | France | Apr. 8, 1922 |
| 575,012 | Great Britain | Jan. 30, 1946 |